(12) United States Patent
Marquier

(10) Patent No.: US 11,360,497 B2
(45) Date of Patent: Jun. 14, 2022

(54) THERMOSTATIC CARTRIDGE, AND MIXER TAP COMPRISING SUCH A THERMOSTATIC CARTRIDGE

(71) Applicant: VERNET, Ollainville (FR)

(72) Inventor: Samuel Marquier, Fleury Merogis (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 17/059,138

(22) PCT Filed: May 27, 2019

(86) PCT No.: PCT/EP2019/063653
§ 371 (c)(1),
(2) Date: Nov. 25, 2020

(87) PCT Pub. No.: WO2019/228981
PCT Pub. Date: Dec. 5, 2019

(65) Prior Publication Data
US 2021/0216090 A1    Jul. 15, 2021

(30) Foreign Application Priority Data
May 28, 2018 (FR) ...................................... 1854500

(51) Int. Cl.
*G05D 23/13* (2006.01)
*F16K 3/30* (2006.01)

(52) U.S. Cl.
CPC ............ *G05D 23/1346* (2013.01); *F16K 3/30* (2013.01)

(58) Field of Classification Search
CPC ..... F16K 3/30; G05D 23/134; G05D 23/1346
See application file for complete search history.

(56) References Cited

U.S. PATENT DOCUMENTS 6,325,295 B1    12/2001  Lorch
2008/0035744 A1*  2/2008  Mace ................ G05D 23/1353
                                                    236/12.2

FOREIGN PATENT DOCUMENTS

FR    92 539 E      11/1968
FR    2 863 732 A1   6/2005
(Continued)

OTHER PUBLICATIONS

Search Report for International Application No. PCT/EP2019/063653 dated Jul. 30, 2019.
(Continued)

*Primary Examiner* — Jonathan Bradford
(74) *Attorney, Agent, or Firm* — Pearne & Gordon LLP

(57) ABSTRACT

A thermostatic cartridge includes: a casing at least partially within and locked translationally along an axis a cartridge body that delimits a chamber, a hot and cold fluid inlet passages and a mixed fluid outlet passage; a slide valve regulating the temperature of the mixed fluid displaceable along the axis to close, in inverse proportions, the inlet passages; a thermostatic element; and a mechanism for adjusting a thermostatic regulation temperature mechanically and displaceably connected to the body and to secure the position of the piston of the element along the axis and to alter the piston position by actuating the adjustment mechanism to move relative to the body. To control the regulation temperature, the casing is rotationally mounted on the body such that the adjustment mechanism is actuated when the casing is between positions-corresponding to extreme low and high temperature values.

15 Claims, 8 Drawing Sheets

(56) References Cited

FOREIGN PATENT DOCUMENTS

GB        2 266 132 A    10/1993
WO    2005/103853 A1    11/2005

OTHER PUBLICATIONS

Search Report for French Application No. 18 54500 dated Jan. 29, 2019.

\* cited by examiner

THERMOSTATIC CARTRIDGE, AND MIXER TAP COMPRISING SUCH A THERMOSTATIC CARTRIDGE

CROSS-REFERENCE TO RELATED APPLICATIONS

This is the National Stage of PCT international application PCT/EP2019/063653, filed on May 27, 2019, which claims the priority of French Patent Application No. 1854500, filed May 28, 2018, both of which are incorporated herein by reference in their entirety.

The present invention relates to a thermostatic cartridge, as well as a mixer tap including such a thermostatic cartridge.

In this type of cartridge, the thermostatic regulation is obtained using a thermostatic element on the one hand comprising a piston that is normally stationary relative to a casing of the cartridge, and on the other hand a heat-sensitive body that typically contains a thermodilatable material such as wax and that is secured to a slide valve. This slide valve is movable relative to the casing so as to cause an inverse variation of the respective flow sections of two fluids to be mixed, called "hot fluid" and "cold fluid", entering inside the casing so as to mix these fluids in variable proportions to obtain an outgoing fluid, called "mixed fluid". By modifying the position of the piston relative to the casing, using an appropriate adjustment mechanism, the thermostatic regulation temperature is set, i.e., the equilibrium temperature around which the temperature of the mixed fluid is controlled. FR-E-92 539 and WO-A1-2005/103853 disclose examples of this type of cartridge.

In order to actuate the adjustment mechanism from outside the casing and thus to control the value of the thermostatic regulation temperature, the cartridge is generally equipped with a control rod, which is arranged coaxially to the cartridge and which extends both outside the casing, to be rotated around itself thereby a user, and inside the casing to be mechanically connected there to the setting mechanism and thus to actuate the displacement of the latter when the user rotates the control rod. In practice, the angular travel of the rod is limited between two angular positions that respectively correspond to an extreme low value and an extreme high value of the thermostatic regulation temperature, this limitation of the travel generally being obtained by the presence of mechanical stops secured to the tap body in which the cartridge is installed. The arrangement of this control rod is satisfactory for taps in which a manual biasing lever can be coupled coaxially with the rod outside the casing. Conversely, for other tap designs, such a central control rod may pose difficulties in terms of integrating the cartridge into the body of the taps.

GB 2 266 132 proposes a different type of cartridge, in which the opening-closing of the mixed water flow and the adjustment of the temperature of this mixed water are controlled using a single member projecting outside the cartridge. This member is coaxially secured to a casing mounted movably inside a cartridge body and a tap body, this mobility being both in translation along the central axis of the cartridge and in rotation about this axis. Thus, one essential feature of the design of this cartridge is that, depending on the axial position of the casing, a supply of cold water and a supply of hot water are jointly opened or closed by the casing.

The aim of the present invention is to propose an alternative thermostatic cartridge, having new arrangements regarding its control of the thermostatic regulation temperature.

To that end, the invention relates to a thermostatic cartridge, including:
- a casing, which is at least partially arranged inside a cartridge body, while being locked in translation along an axis relative to the cartridge body, which casing simultaneously delimits:
  - a chamber in which a hot fluid and a cold fluid mix to form a mixed fluid,
    - a hot fluid inlet passage, through which the hot fluid penetrates the chamber from outside the casing,
    - a cold fluid inlet passage, through which the cold fluid penetrates the chamber from outside the casing, and
    - a mixed fluid outlet passage, through which the mixed fluid contained in the chamber leaves the casing,
- a slide valve for regulating the temperature of the mixed fluid, which is arranged inside the chamber and which is movable along the axis relative to the casing so as to close, in respective inverse proportions, the hot fluid inlet passage and the cold fluid inlet passage,
- a thermostatic element which includes:
  - a heat-sensitive body, which is secured to the slide valve and which is arranged to be in contact with the mixed fluid, and
  - a piston, the heat-sensitive body and the piston moving relative to one another along the axis as a function of the temperature of the mixed fluid, and
- an adjustment mechanism for adjusting a thermostatic regulation temperature, which, in a usage configuration, is movably mechanically connected to the cartridge body and is designed to secure the position of the piston along the axis relative to the casing and to alter this position of the piston by actuating the adjustment mechanism to move relative to the cartridge body, wherein the casing is mounted on the cartridge body so as to rotate about the axis, while being rotationally drivable from the outside of the cartridge body, and is mechanically connected to the adjustment mechanism in the usage configuration so as to actuate this adjustment mechanism to move relative to the cartridge body when the casing is driven in rotation between first and second angular positions, which respectively correspond to an extreme low value and an extreme high value of the thermostatic regulation temperature.

Thus, the invention runs counter to the traditional arrangement in which the control of the thermostatic regulation temperature is ensured by a dedicated member, occupying the central region of one of the axial ends of the cartridge, such as a rod: the idea at the base of the invention is to use, as control member of the cartridge, the casing thereof, which defines the mixing chamber of the hot and cold fluids and which is passed through by these hot and cold fluids, entering the cartridge, to reach the mixing chamber. To this end, the casing is not fixed in rotation, but is mounted rotatably about the axis inside a cartridge body that is intended to be received fixedly in a tap body. The driving in rotation of this casing from the outside of the cartridge body can then be provided according to various arrangements, notably at an axial end of this casing and/or at the outer periphery of this casing. The invention can thus advantageously allow a direct hydraulic path, that is to say with no 180° hydraulic elbow, to be kept in the case where the hot fluid and cold fluid inlets into the cartridge are axially opposite the mixed fluid outlet. The invention can also advantageously allow all of the components of the thermostatic cartridge, without its cartridge body, to be connected in rotation about the axis and thus to be driven in rotation jointly with its casing, which prevents or limits the friction from relative displacement between these components.

According to additional advantageous features of the thermostatic cartridge according to the invention:

The casing and the adjustment mechanism are connected in rotation about the axis relative to one another and are translatable along the axis relative to one another, and the adjustment mechanism in the usage configuration and the cartridge body are connected to one another by a helical connection centered on the axis.

The adjustment mechanism includes:
a nut which is connected in rotation about the axis to the casing, while being translatable along the axis relative to the casing, and which is provided with a thread which, in the usage configuration of the adjustment mechanism, is screwed to a thread of the cartridge body while forming the helical connection,
an endpiece, which is mounted on the nut so as to slide along the axis, and
a resilient compression member, which is axially interposed between the nut and the endpiece, and which is designed, when the adjustment mechanism is in the usage configuration, both to keep the endpiece axially pressed against the piston so as to adjust the position of this piston along the axis relative to the casing and to compress axially so as to resiliently take up a deployment overtravel of the piston relative to the heat-sensitive body.

The adjustment mechanism is designed, when the casing is driven in rotation about the axis past the first angular position, to go between the usage configuration and a disengaged configuration in which the connection between the adjustment mechanism and the cartridge body is interrupted.

In the disengaged configuration of the adjustment mechanism, the thread of the nut is disengaged from the thread of the cartridge body, and, in the disengaged configuration of the adjustment mechanism, the resilient compression member is designed to keep the thread of the nut and the thread of the cartridge body axially butted.

The casing has a tubular shape, centered on the axis, and includes:
a first annular end part, which mechanically cooperates with the adjustment mechanism in the usage configuration,
a second annular end part, which is axially opposite the first annular end part, which delimits the mixed fluid outlet passage and which extends at least partially outside the cartridge body, and
an intermediate annular part, which couples the first and second annular end parts, and which delimits the hot fluid inlet passage and the cold fluid inlet passage.

The first annular end part of the casing cooperates mechanically with the nut of the adjustment mechanism).

The cartridge body comprises a tubular wall, inside which the casing is received coaxially and which includes:
a first end part, which inwardly receives the first annular end part of the casing, and which inwardly receives, by mechanically cooperating with, the adjustment mechanism in the usage configuration, and
a second end part, which is axially opposite the first end part and which inwardly receives the intermediate annular part of the casing.

The first end part of the tubular wall of the cartridge body inwardly receives, by mechanically cooperating with, the nut of the adjustment mechanism.

The second annular end part of the casing forms, at its axial end opposite the rest of the casing, a crown gear which is centered on the axis, which extends to the outside of the second end part of the tubular wall of the cartridge body, and which is designed to be coupled with a system for driving in rotation about the axis.

The crown gear extends entirely outside the second end part of the tubular wall of the cartridge body.

The crown gear is designed to be coupled with the system for driving in rotation about the axis by shape matching.

The inner volume of the tubular wall of the cartridge body is closed by a transverse wall of the cartridge body, which extends transversely to the axis and which is located at the axial end, opposite the second end part, of the first end part of the tubular wall, and the tubular wall delimits, in its thickness, a channel for the hot fluid and a channel for the cold fluid, which open axially through the transverse wall and which, axially opposite this transverse wall, open into the inner volume of the tubular wall.

The invention also relates to a mixer tap, comprising a tap body, which is intended to be supplied with hot fluid and with cold fluid, and a thermostatic cartridge, which is as defined above and the cartridge body of which is fixedly attached to the inside of the tap body.

The invention will be better understood upon reading the following description, provided solely as an example and done in reference to the drawings, in which.

FIGS. 1 to 7 show a thermostatic cartridge 1 that is arranged about and along a central axis X-X. The cartridge 1 is designed to equip a mixer tap 2 so as to mix hot water and cold water therein.

Figure 5:
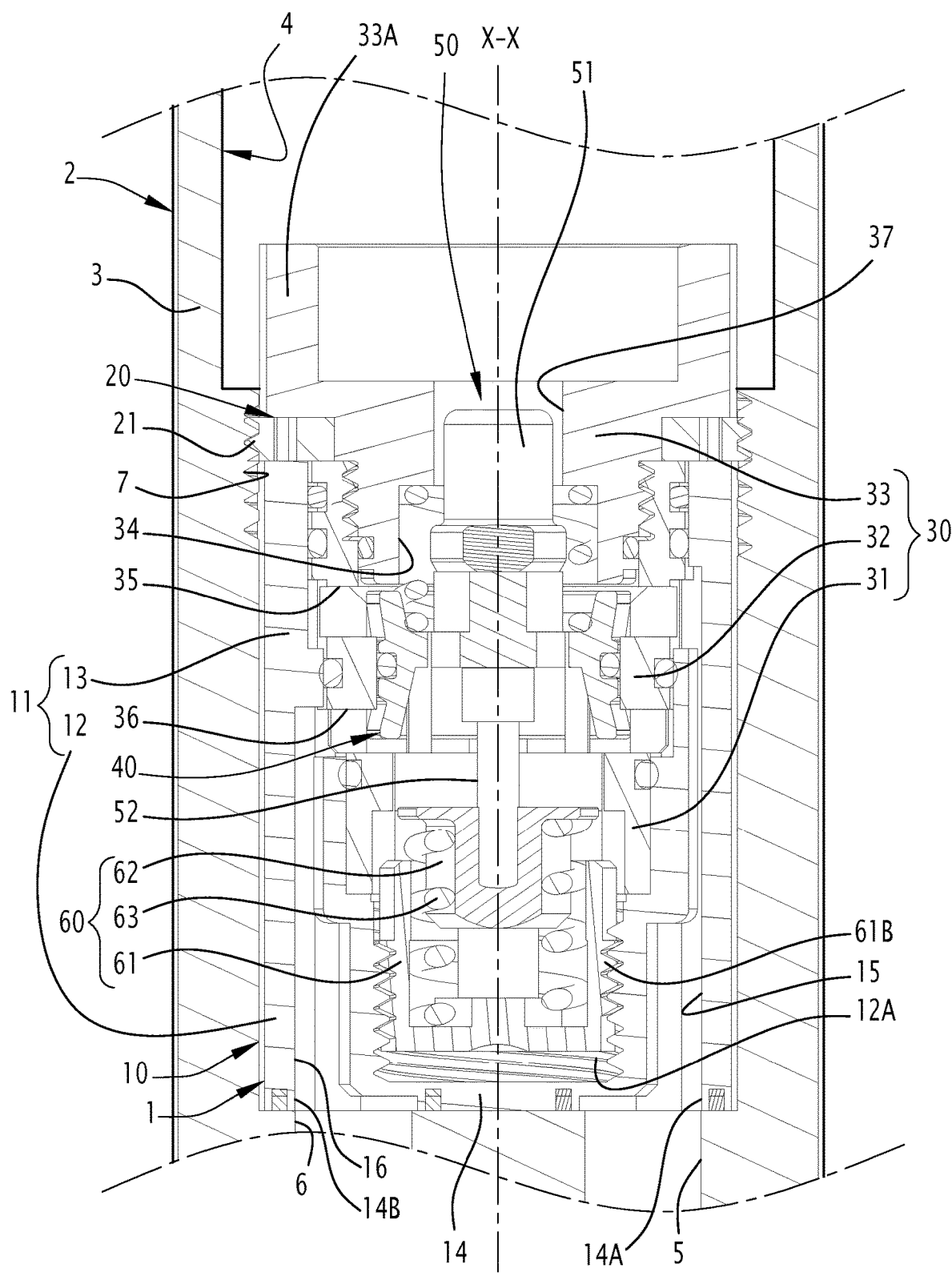

In the example embodiment considered here, the tap 2 includes a tap body 3 that delimits a cavity 4 for receiving the cartridge 1. As shown in FIG. 5, the tap body 3 is provided with a hot water inlet 5 and a cold water inlet 6, which open in the bottom of the cavity 4. The specificities of the tap 2 are not limiting with respect to the invention.

For convenience, the remainder of the description of the cartridge 1 is oriented relative to the axis X-X, considering that the terms "bottom", "lower" and the like are used to designate elements of the cartridge that face toward the bottom of the cavity 4 when the cartridge is received in this cavity, while the terms "top", "upper" and the like are used to designate elements of the cartridge that face axially in the opposite direction. Thus, in FIGS. 4 to 7, the upper elements of the cartridge 1 face toward the top part of the figures. In practice, it will be understood that this orientation defined here for convenience is not limiting with respect to the invention: in particular, when the cartridge 1 is received in the cavity 4 of the tap body 3, the axis X-X of this cartridge cannot extend vertically and/or the top part of the cartridge cannot face upward, along the actual spatial orientation of the tap body 3.

Figure 1:
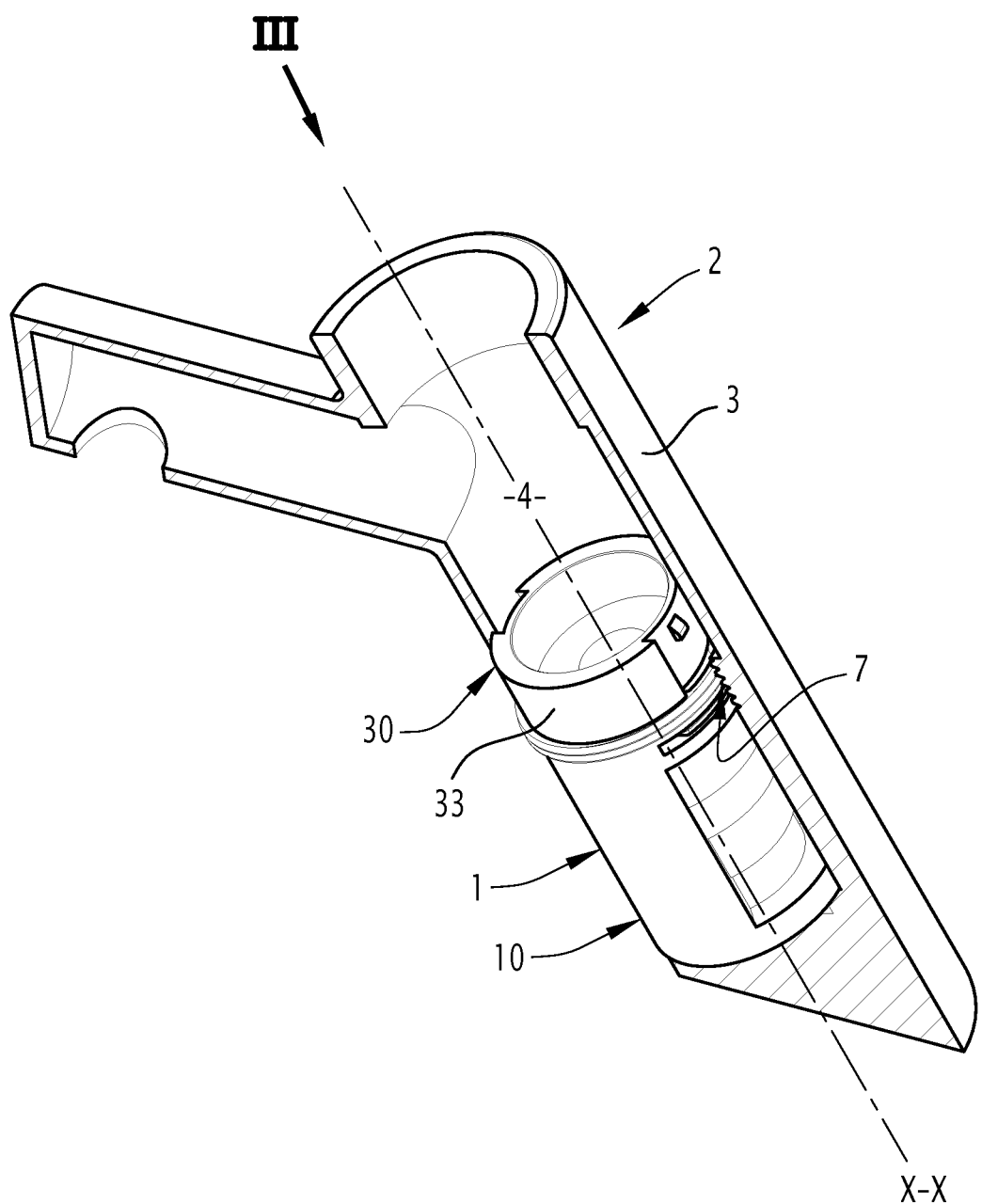
FIG. 1 is a perspective view of a mixer tap, equipped with a cartridge according to the invention, a body of the tap being cut longitudinally.
Figure 2:
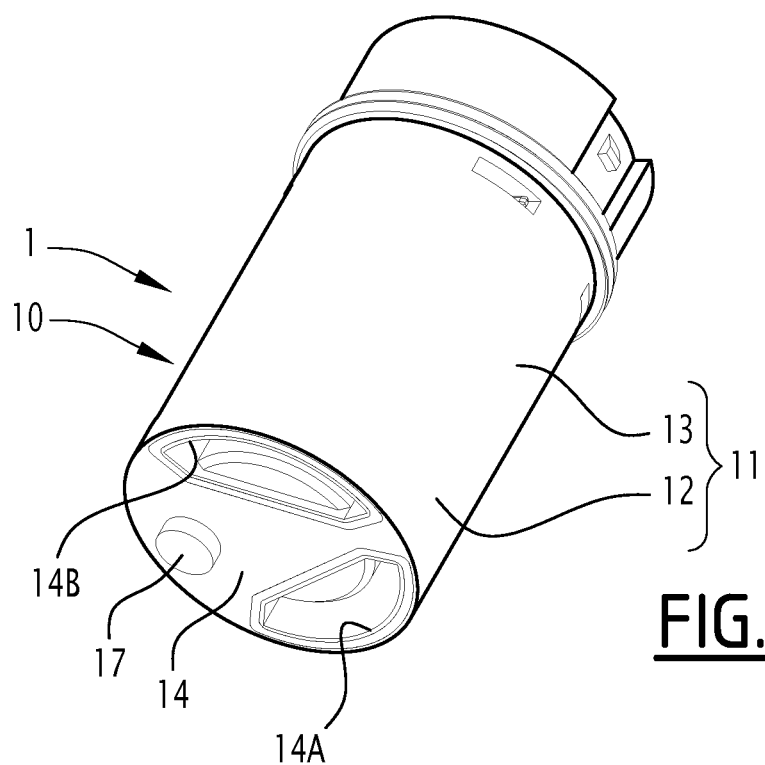
FIG. 2 is a perspective view of the cartridge of FIG. 1, shown alone.
Figure 3:
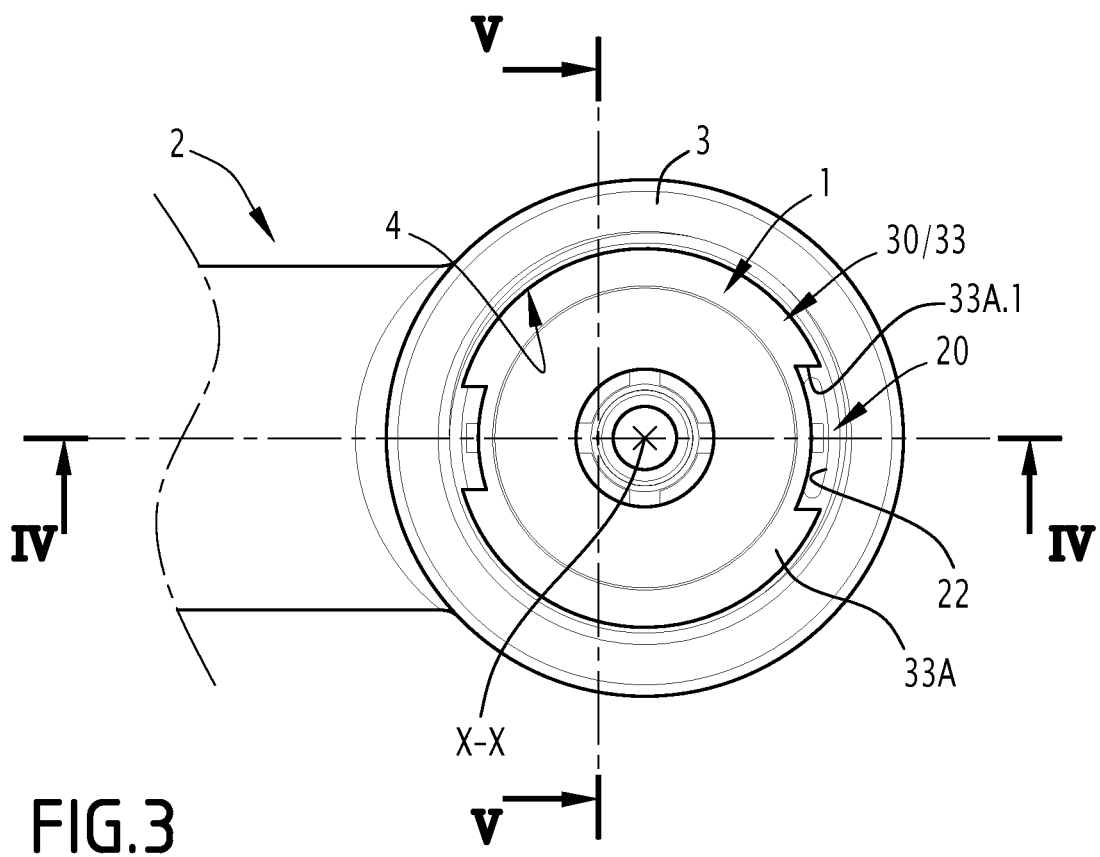
FIG. 3 is an elevation view along arrow III of FIG. 1.
Figure 4:
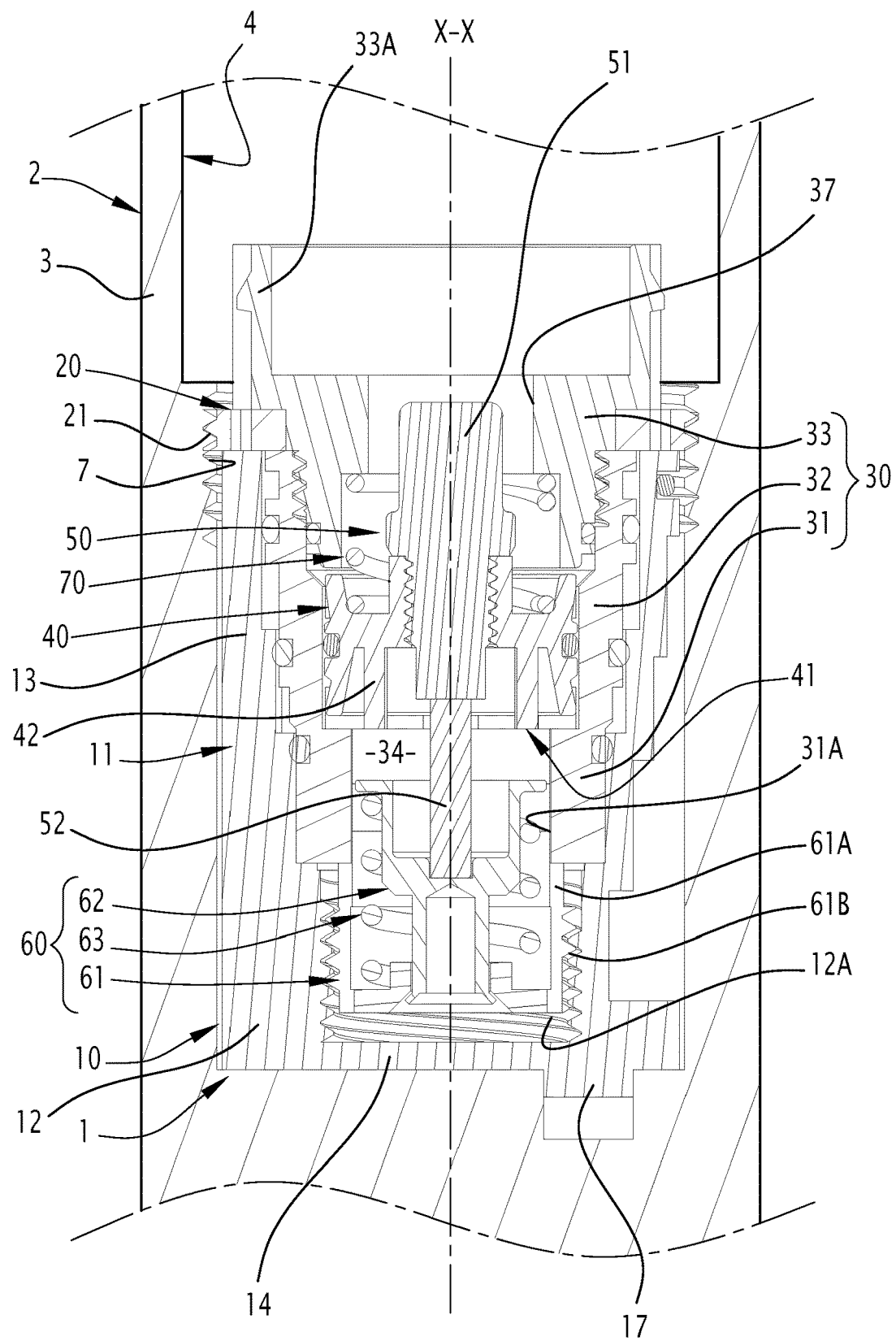
FIGS. 4 and 5 are sectional views along line IV-IV and line V-V of FIG. 3, respectively.
Figure 9:
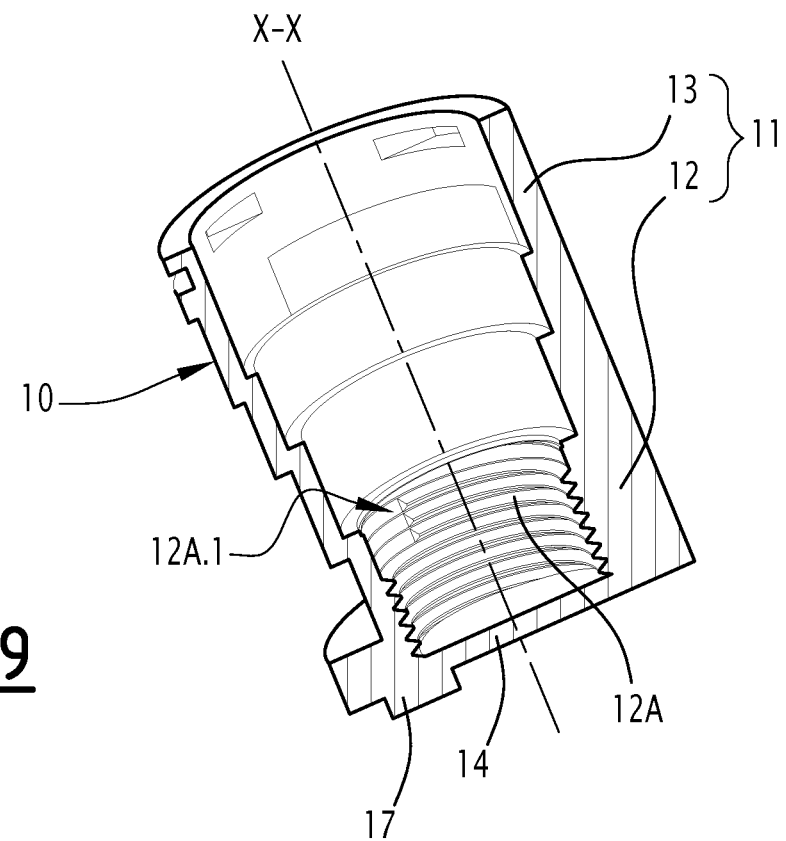
FIG. 9 is a perspective view of a longitudinal section of a cartridge body, belonging to the cartridge of the preceding figures.

The cartridge 1 includes a cartridge body 10 that, in addition to being visible in FIGS. 1 to 7 while assembled to the other components of the cartridge 1, is shown alone in FIG. 9. In the example embodiment considered here, this cartridge body 10 includes a tubular wall 11, which is centered on the axis X-X and which includes axially opposite end parts, respectively lower 12 and upper 13. As shown in FIGS. 4, 5 and 9, the tubular wall 11 inwardly delimits an elongated inner volume, which, at the upper end of the upper end part 13, is open along the axis X-X to the outside of the cartridge body 10, but which, at the lower end of the lower end part 12, is axially closed by a transverse wall 14 of the cartridge body 10, which extends transversely to the axis X-X. As shown in FIGS. 2 and 5, the transverse wall 14 delimits two peripheral axial openings 14A and 14B, which extend upward in the thickness of the tubular wall 11 in the form of two respective channels 15 and 16. As shown in FIGS. 5 and 9, these channels 15 and 16 open, at their upper end, into the inner volume of the tubular wall 11, at the upper end part 13 of this tubular wall 11. In the assembled state of the cartridge 1 in the tap body 3, the hot water inlet 5 opens into the opening 14A so as to supply the channel 15 with hot water and the cold water inlet 6 opens into the opening 14B so as to supply the channel 16 with cold water.

As shown in FIGS. 1, 2, 4 and 5, the cartridge 1 also includes a mounting ring 20 making it possible to assemble the cartridge to the tap body 3. This mounting ring 20 is designed to lock, in particular to clamp, the cartridge body 10 against the tap body 3 and thus to fixedly immobilize the cartridge body 10 inside the cavity 4. The mounting ring 20 here is provided to this end with an outer thread 21 that is able to be screwed in an inner tapping 7 of the tap body 3 when the mounting ring 20 is driven in rotation about the axis X-X. In the example embodiment considered in the figures, the mounting ring 20 is arranged at the upper end of the upper end part 13 of the tubular wall 11 of the cartridge body 10 so as, during the screwing of the outer thread 21 in the inner tapping 7, to press the cartridge body 10 axially downward against the bottom of the cavity 4, which makes it possible to improve, by taking up the axial play, the sealing of the junction between the hot water inlet 5 and the channel 15 and of the junction between the cold water inlet 6 and the channel 16.

As shown in FIGS. 4 and 5, the cartridge 1 further includes a casing 30, which has a tubular shape centered on the axis X-X. This casing 30 thus inwardly delimits an elongated inner volume, centered on the axis X-X. This casing 30 includes three successive annular parts along the axis X-X, namely a lower end annular part 31, an intermediate annular part 32 and an upper end annular part 33 that is coupled to the lower part 31 by the intermediate part 32.

In the assembled state of the components of the cartridge 1, the casing 30 is at least partially arranged inside the cartridge body 10, while being mounted on this cartridge body so as to rotate about the axis X-X. In the example embodiment considered here, the casing 30 is received coaxially inside the tubular wall 11: as visible in FIGS. 4 and 5, the lower part 31 of the casing 30 is received inside the lower end part 12 of the tubular wall 11, the intermediate part 32 of the casing 30 is received inside the upper end part 13 of the tubular wall 11, and the upper part 33 of the casing 30 extends, at least partially if not essentially, outside the tubular wall 11. The mounting ring 20 is advantageously integrated into the cartridge 1 in the assembled state of the components of the latter, while being retained around the upper part 33, axially between an outer shoulder of the latter and the upper end of the tubular wall 11 of the cartridge body 10. The lower 12 and upper 13 end parts of the tubular wall 11 have cylindrical inner surfaces, with circular bases centered on the axis X-X, which are complementary to the outer surfaces of the lower part 31 and the intermediate part 32, as well as, if applicable, the upper part 33, of the casing 30, so as to allow the free rotation of the casing 30 about the axis X-X relative to the cartridge body 10, with relative guiding. Furthermore, in the assembled state of the cartridge 1 in the tap body 3, the casing 30 is locked in translation, along the axis X-X relative to the cartridge body 10: in the example embodiment considered here, in the assembled state of the cartridge 1 in the tap body 3, the casing 30 abuts axially downward against an inner shoulder of the tubular wall 11 and abuts axially upward against the mounting ring 20.

Inwardly, the casing 30 delimits a chamber 34 inside which the hot water and the cold water, coming from the inlets 5 and 6 of the tap body 3, are provided to mix in order to form mixed water in the assembled state of the cartridge 1 in the tap body 3. This chamber 34 thus occupies all or part of the inner volume of the casing 30.

In order to allow the hot water to penetrate the chamber 34 from the outside of the casing 30, the latter delimits a hot water inlet passage 35 that passes radially all the way through the casing 30 in the intermediate part 32 of the latter, while being located axially at the upper mouth of the channel 15, as visible in FIG. 5. Likewise, in order to allow the cold water to penetrate the chamber 34 from the outside of the casing 30, the latter delimits a cold water inlet passage 36 that passes radially all the way through the casing 30 in the intermediate part 32, while being located axially at the upper mouth of the channel 16. These hot 35 and cold 36 water inlet passages are offset relative to one another along the axis X-X and for example assume the form of arcs of circumference, centered on the axis X-X.

Furthermore, in order to allow the mixed water contained in the chamber 34 to leave the casing 30, the latter delimits a mixed water outlet passage 37. In the example embodiment considered here, this outlet passage 37 is located at the upper end of the casing 30, while being centered on the axis X-X and extending axially at the upper part 33 of the casing 30, as shown in FIGS. 4 and 5. Thus, the cartridge body 10 and the casing 30 make it possible, in the state assembled to one another, for the hydraulic path through the cartridge 1 to be direct between the hot water 5 and cold water 6 inlets, opening on an axial side of the cartridge, and an outlet, from the opposite axial side of the cartridge, for the mixed water leaving the outlet passage 37: in particular, the flow through the cartridge 1 has no 180° hydraulic elbow.

It will be noted that in the example embodiment considered in the figures, the casing 30 is made up of two separate pieces, fixedly and permanently secured to one another in the assembled state of the components of the cartridge 1: an upper piece constitutes the lower part 31 of the casing 30, as well as most, if not all, of the intermediate part 32 of the latter, while an upper piece constitutes the upper part 33, as well as, if applicable, the rest of the intermediate part 32. This embodiment of the casing 30, fixedly associating these two pieces, can be of interest for the assembly of the components of the cartridge 1, but is not limiting with respect to the invention. Likewise, the nature of the stationary securing between these two pieces is not limiting: in the example considered here, these two pieces are permanently screwed to one another, but they could be glued, welded, etc.

The cartridge 1 also includes a slide valve 40, which is arranged inside the chamber 34 and which is movable therein along the axis X-X, while advantageously being guided by sliding against a complementary cylindrical inner face of the intermediate part 32 of the casing 30. The slide valve 40 is movable along the axis X-X between two opposite extreme positions, namely an extreme high position, in which its upper axial end completely closes the hot water inlet passage 35 while its lower axial end leaves the cold water inlet passage 36 wide open, and an extreme low position in which the lower axial end of the slide valve 40 completely closes the cold water inlet passage 36 while its upper axial end leaves the hot water inlet passage 35 wide open. In FIGS. 4 and 5, the slide valve 40 occupies an intermediate position between these two extreme positions. Thus, by movement along the axis X-X, the slide valve 40 closes, in inverse respective proportions, the hot water 35 and cold water 36 inlet passages, thus making it possible to regulate the temperature of the mixed water resulting from the mixing of the hot water and cold water respectively allowed into the chamber 34 through these inlet passages 35 and 36 that are more or less closed by the slide valve 40.

In order to drive the translation of the slide valve 40 along the axis X-X, the cartridge 1 includes a thermostatic element 50 that includes a heat-sensitive body 51 and a piston 52, which, in the assembled state of the components of the cartridge, are substantially centered on the axis X-X. The heat-sensitive body 51 is secured to the slide valve 40, for example by screwing, with the understanding that this securing between the slide valve 40 and the heat-sensitive body 51 is to be understood as a kinematic connection of one to the other and that the embodiment of this securing is not limiting. Furthermore, the thermostatic element 50 is designed so that its heat-sensitive body 51 and its piston 52 move relative to one another along the axis X-X, this relative movement being controlled by a temperature variation applied to the heat-sensitive body 51. To this end, the heat-sensitive body 51 for example contains a thermodilatable material, which, during its expansion, causes the piston 52 to be deployed relative to the heat-sensitive body 51 and which, during its contraction, allows the piston to retract relative to the heat-sensitive body. Other forms of heat actuation can be considered for the thermostatic element 50. In all cases, in order for the relative axial movement between the heat-sensitive body 51 and the piston 52 to be controlled by the temperature of the mixed water formed in the chamber 34, this heat-sensitive body 51 is arranged to be in contact with the mixed water, while being at least partially positioned in the chamber 34 and/or in the mixed water outlet passage 37. The piston 52 is in turn coupled to a mechanism, referenced 60 and described in detail later.

In the scenario where the mechanism 60 keeps the position of the piston 52 stationary along the axis X-X relative to the casing 30, the temperature of the mixed water at the outlet of the cartridge 1 is thermostatically regulated by the slide valve 40 and the thermostatic element 50. Indeed, in this scenario, the temperature of the mixed water results directly from the respective quantities of hot water and cold water allowed into the chamber 34 respectively via the inlet passages 35 and 36 that are more or less closed by the slide valve 40, as previously explained. If a disruption occurs in the hot water 5 and cold water 6 inlets and, for example, the temperature of the mixed water increases, the piston 52 is deployed axially relative to the heat-sensitive body 51, which causes the upward translation of the heat-sensitive body 51 and therefore of the slide valve 40: the proportion of hot water through the inlet passage 35 decreases while, conversely, the proportion of cold water through the inlet passage 36 increases, which causes a decrease in the temperature of the mixed water. An inverse reaction occurs when the temperature of the mixed water decreases, having noted that a compression spring 70 is provided to return the heat-sensitive body 51 and the piston 52 toward one another when the latter retracts, for example during a contraction of the thermodilatable material contained in the heat-sensitive body 51. In the example embodiment considered in the figures, this return spring 70 is interposed axially between the casing 30 and the slide valve 40. The corrections to the temperature of the mixed water result in a regulation equilibrium for this temperature of the mixed water, at a thermostatic regulation temperature that depends on the position, imposed by the mechanism 60, of the piston 52 along the axis X-X.

Figure 6:
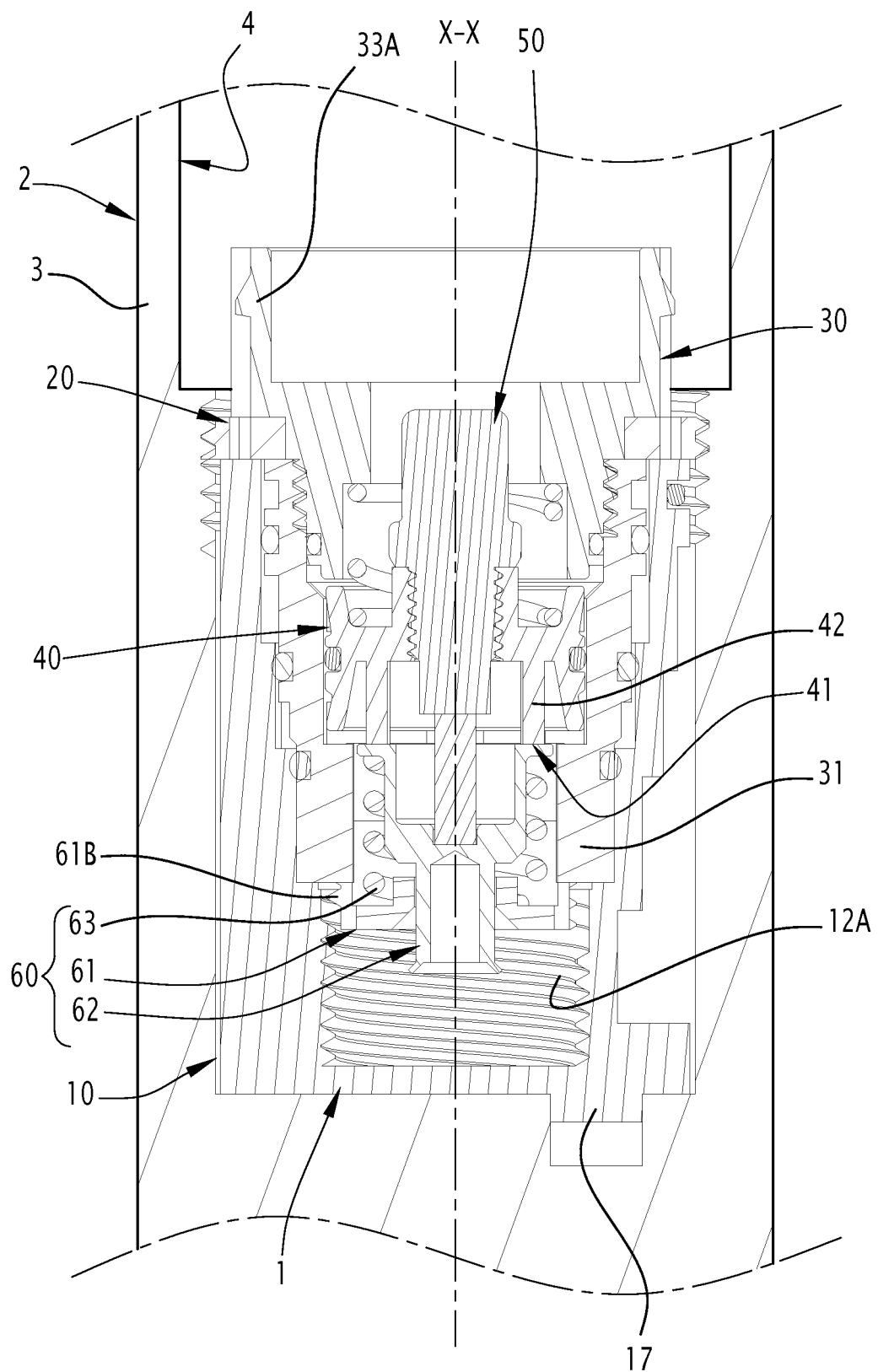
FIGS. 6 and 7 are views similar to FIGS. 4 and 5, respectively, but illustrating the cartridge during assembly inside the tap body.
Figure 7:
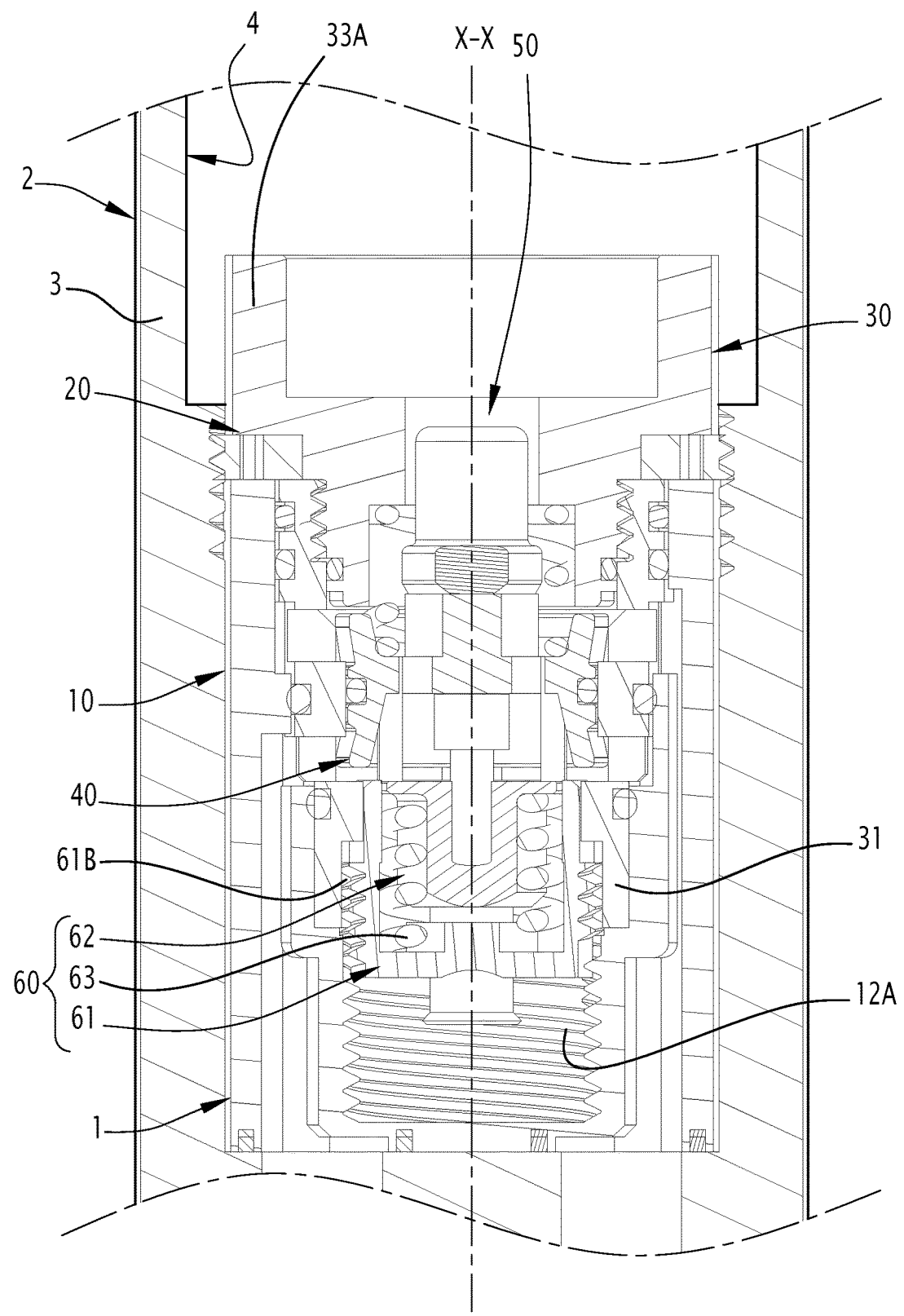

The mechanism 60 makes it possible to set the value of the thermostatic regulation temperature, by acting on the axial position of the piston 52 of the thermostatic element 50. It will be noted that, for reasons given later, the mechanism 60 of the cartridge 1 considered here can go between a usage configuration, which is shown in FIGS. 4 and 5 and which will be described in detail below, and a disengaged configuration, which is shown in FIGS. 6 and 7 and which will be presented afterwards.

Figure 8:
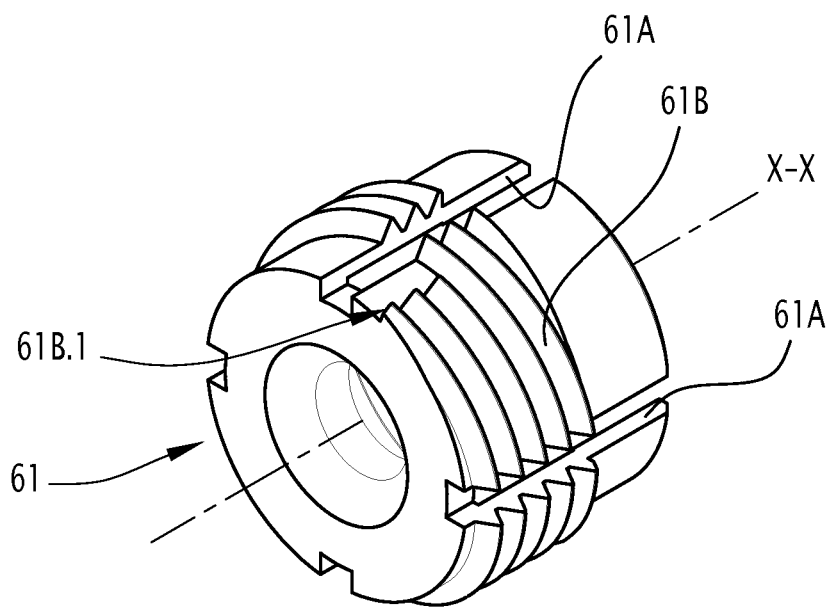
FIG. 8 is a perspective view of a nut, shown alone, belonging to the cartridge of the preceding figures.

In the example embodiment considered here, the mechanism 60 includes a nut 61, which is shown alone in FIG. 8 and which is centered on the axis X-X in the assembled configuration of the components of the cartridge 1. The mechanism 60 also includes an endpiece 62, which is centered on the axis X-X, which couples the piston 52 of the thermostatic element 50 to the rest of the mechanism 60 and which is shown on the nut 61 freely sliding along the axis X-X, the embodiment of this sliding not being limiting: here, the endpiece 62 is mounted sliding in a central bore complementary to the nut 61, as shown in FIG. 4. Furthermore, the mechanism 60 includes a compression spring 63, which is centered on the axis X-X and which is axially interposed between the nut 61 and the endpiece 62: the spring 63 tends to keep the nut 61 and the endpiece 62 axially separated from one another, having noted that the spring 63 is significantly stiffer or more powerful than the return spring 70. In practice, to prevent the endpiece 62 from disengaging with respect to the nut 61 under the effect of the spring 63, the mechanism 60 incorporates a translational retaining means, the embodiment of which is not limiting and which, in the example embodiment considered here, is provided in the form of a fold, toward the outside, of the lower end of the endpiece 62 that is provided to interfere axially with the nut in the central bore of the latter, as shown in FIG. 4.

With respect to the casing 30, the nut 61 is both locked in rotation about the axis X-X and translatable along this axis. To this end, in the example embodiment considered here, the nut 61 is provided with grooves 61A, which each extend lengthwise parallel to the axis X-X and which are distributed around this axis over the periphery of the nut 61, as shown in FIG. 8: in the assembled state of the components of the cartridge 1, each of these grooves 61A receives a complementary rib 31A supported inwardly by the lower part 31 of the casing 30, as shown in FIGS. 4 and 5. The cooperation between the grooves 61A and the ribs 31A connects the casing 30 and the nut 61 to one another in rotation about the axis X-X while ensuring, and advantageously guiding, the relative mobility of the latter in translation along the axis X-X. Of course, embodiments other than the grooves 61A and ribs 31A can be considered, in particular to form a slide connection, centered on the axis X-X, between the nut 61 and the lower part 31 of the casing 30.

With respect to the cartridge body 10, the nut 61 is, in the usage configuration of the mechanism 60, connected according to a helical connection centered on the axis X-X. To this end, in the example embodiment considered here, the nut 61 bears, on its outer face, a thread 61B that is centered on the axis X-X, as visible in FIG. 8, while the lower end part 12 of the tubular wall 11 of the cartridge body 10 is provided, inwardly, with a thread 12A that is centered on the axis X-X, as shown in FIG. 9. It will be noted that in the present document, the term "thread" is used to designate both an outwardly protruding helical shape, such as the thread 61B, and a tapping, such as the thread 12A; likewise, the term "nut" is used to designate a pierced assembly piece, provided with such a thread, such as the nut 61. The threads 12A and 61B are complementary, and their screwing to one another forms the helical connection, centered on the axis X-X, between the lower part 12 of the tubular wall 11 of the cartridge body 10 and the nut 61 of the mechanism 60 in the usage configuration. In order to limit the radial space requirement of the nut 61, the grooves 61A of the latter advantageously pass through the tubular wall of the nut, locally interrupting the thread 61B.

In light of the connections, described in detail above, between the cartridge body 10, the casing 30 and the nut 61 of the mechanism 60 in the usage configuration, it will be understood that setting the casing 30 in rotation about the axis X-X relative to the cartridge body 10 causes both the screwing or the unscrewing, depending on the rotational driving direction of the casing 30, of the nut 61 in the cartridge body 10 and the upward or downward translation, depending on the rotational driving direction of the casing 30, of the nut 61 with respect to the casing 30. Furthermore, the translational driving of the nut 61 is transmitted by the spring 63 to the endpiece 62, the latter acting in a corresponding manner on the piston 52 of the thermostatic element 50, thus setting the position of this piston along the axis X-X relative to the casing 30, due to the fact that when the mechanism 60 is in the usage configuration, the endpiece 62 is kept axially pressed against the piston 52 under the effect of the spring 63. Thus, when the casing 30 is driven in rotation about the axis X-X relative to the cartridge body 10, the mechanism 60 in the usage configuration is actuated to move relative to the cartridge body 10 so as to modify the position of the piston 52 along the axis X-X. Advantageously, in the example embodiment considered here, all of the components of the cartridge 1, aside from the cartridge body 10, can thus be driven in rotation about the axis X-X jointly with the casing 30, thus preventing or limiting the internal friction from relative movement between these components. In all cases, it will be understood that the casing 30 forms a control member making it possible to control the actuation of the mechanism 60.

It will be noted that, in the usage configuration of the mechanism 30, the transmission of forces by the spring 63 between the nut 61 and the endpiece 62 is substantially rigid due to the significant stiffness of this spring, having noted, however, that this spring 63 allows axial compression in order to resiliently take up a deployment overtravel of the piston 52 relative to the heat-sensitive body 51 during strong heating of the thermostatic element 50, for example following a sharp drop or a cutoff of the cold water supply.

In the assembled state of the cartridge 1 in the tap body 3, the casing 30 must be able to be driven in rotation about the axis X-X by the user from the outside of the cartridge body 10. To this end, the upper part 33 of the casing 30 is used, due to the fact that this upper part 33 extends at least partially outside the cartridge body 10: a system for driving in rotation about the axis X-X, which is intended to be manipulated manually by the user and not shown in the figures, can be arranged in the tap body 3, inside the cavity 4 thereof, above the thermostatic cartridge 1, to be coupled to the upper part 33 of the casing 30, for example by shape matching. This system for driving in rotation, which does not belong to the thermostatic cartridge 1, is not limiting with respect to the invention. This being the case, it will be understood that according to the specificities of this driving system, if applicable in connection with the specific design of the tap body 3, the geometry, that is to say the shape and/or the dimensions of the upper part 33 of the casing 30, can be developed accordingly. In particular, in the example embodiment considered here, the upper part 33 of the casing 30 forms, at its upper end, a crown gear 33A that is provided to be coupled with the aforementioned rotational driving system by shape matching: this crown gear 33A is centered on the axis X-X and extends entirely outside the cartridge body 10, above the upper end part 13 of the latter.

In all cases, in the assembled state of the cartridge 1 in the tap body 3, the driving of the casing 30 in rotation about the axis X-X should only be provided over a limited angular travel, namely an angular travel between first and second angular positions that respectively correspond to an extreme low value and an extreme high value for the thermostatic regulation temperature. To this end, in a manner known in itself and not described in detail here, two mechanical stops are integrated into the tap body 3 so as to limit the driving travel of the aforementioned rotational driving system: when the rotational driving system is placed against one of these stops, this rotational driving system places the casing 30 in one of the first and second angular positions that are respectively associated with the extreme low and high values of the thermostatic regulation temperature, whereas when the rotational driving system is placed against the other stop, this rotational driving system places the casing 30 in the other of the first and second aforementioned angular positions.

Furthermore, also in a manner known in itself and which is not described in detail here, the final assembly of the components of the cartridge 1 is done with temperature calibration of this cartridge. In order to perform the calibration of a thermostatic cartridge, it is known to have the cartridge supplied with hot water and cold water under normal conditions, then to adjust the position of the control member making it possible to actuate the adjustment mechanism for the thermostatic regulation temperature, in order for the mixed water leaving the cartridge to have a predetermined temperature, for example equal to 38° C.; the relative angular position between the control member and the cartridge body is then identified, in order to be able to find it when the cartridge will next be installed in a tap body and coupled to a manual driving system of the control member. To calibrate the cartridge 1, it is supplied under normal conditions and the angular position, about the axis X-X, of the casing 30 is identified when the mixed water leaving the cartridge 1 has the aforementioned predetermined temperature. This identification is done using respective markings on the cartridge body 10 and on the casing 30, in particular on the upper part 33 of the latter so that the corresponding marking is easily observable from the outside of the cartridge body. Advantageously, due to the helical connection between the cartridge body 10 and the nut 61 of the mechanism 60 in the usage configuration, the aforementioned marking may not be provided on the cartridge body 10 once, in the assembled state of the cartridge 1 in the tap body 3, the angular positioning of the cartridge body in the cavity 4 is predetermined in a stationary manner, with, for example, an angular positioning pin of the cartridge body in the tap body, such as a positioning pin 17 borne projecting axially downward by the transverse wall 14 in the example embodiment considered here. Of course, in this case, the tap body 3 must bear a marking that will make it possible to identify the calibration of the thermostatic cartridge 1.

As mentioned above, the mechanism 60 can go from its usage configuration, described thus far, to the disengaged configuration shown in FIGS. 6 and 7. In this disengaged configuration, the connection between the mechanism 60 and the cartridge body 10 is interrupted: thus, in the example embodiment considered here, the screw thread 61A of the nut 61 is disengaged from the thread 12A of the cartridge body 10, while being kept axially butted against the latter under the action of the spring 63.

The passage of the mechanism 60 between the usage configuration and the disengaged configuration is controlled by the driving of the casing 30 in rotation about the axis X-X. As explained hereinafter, the passage of the mechanism 60 between these two configurations can advantageously take place during the assembly of the cartridge 1 in the tap body 2, facilitating this assembly. Indeed, after having introduced and positioned the cartridge 1, in the assembled state of the components of the latter, in the cavity 4 of the tap body 3, assembling the cartridge to the tap body 3 requires, as explained above, screwing the mounting ring 20 in the tap body 3, at the tapping 7 of the latter. However, in light of the presence of the crown gear 33A at the upper end of the casing 30, driving the mounting ring 20 in rotation for screwing thereof may cause the casing 30 to be set in rotation about the axis X-X. When the outer diameter of the crown gear 33A is substantially equal to that of the mounting ring 20, the simultaneous driving of this mounting ring 20 and of the casing 30 is even inevitable once the mounting ring 20 is set in rotation through the crown gear 33A: thus, in the example embodiment considered here and as shown in FIG. 3, a peripheral indentation 33A.1 of the crown gear 33A allows axial access to a relief 22 of the mounting ring 20, so as to be able to drive the latter in rotation on itself about the axis X-X owing to a tool introduced axially through the indentation 33A.1 in order to cooperate with the relief 22. In practice, before beginning to screw the mounting ring 20, the cartridge body 10 must be locked angularly about the axis X-X relative to the tap body 3 in order to prevent the cartridge 1 from rotating on itself in the cavity 4: this locking is advantageously ensured by the cooperation of the positioning pin 17 with a complementary recess, arranged in the bottom of the cavity 4 and in which this pin is received, as shown in FIGS. 4 and 6. Furthermore, the screwing of the mounting ring 20 in the tapping 7 of the tap body 3 requires driving this ring in rotation over several revolutions: the casing 30 is driven in rotation on itself in a corresponding manner, that is to say over several revolutions. It will be understood that the casing 30 is thus driven in rotation about the axis X-X over more than the limited angular travel, mentioned above and defined between the first and second angular positions of the casing 30 respectively associated with the extreme low and high values of the thermostatic regulation temperature. More specifically, the screwing of the mounting ring 20 drives the casing 30 in rotation past its first angular position, that is to say that corresponding to the extreme low position of the thermostatic regulation temperature, and in the direction opposite that oriented toward its second angular position, that is to say that corresponding to the extreme high position of this thermostatic regulation temperature.

This driving in rotation of the casing 30 causes the mechanism 60 to go from its usage configuration of FIGS. 4 and 5 to its disengaged configuration of FIGS. 6 and 7, subject to the complete unscrewing of the nut 61 with respect to the cartridge body 10 and the translational retraction of this nut to the inside of the lower part 31 of the casing 30. The upward driving in translation of the nut 61 tends to drive the endpiece 62, pressed axially upward against the piston 52, in a corresponding manner: the thermostatic element 50 then tends to compress axially, by forced retraction of its piston 52 to the inside of the heat-sensitive body 51, but with an axial compression travel that can be less than the axial retraction travel of the nut 61 in the lower part 31 of the casing 30, then leading to an axial compression of the spring 63, as shown by comparing FIGS. 4 and 5 with FIGS. 6 and 7. In this way, the mechanism 60 thus disengaged and the thermostatic element 50 are neither locked nor damaged, despite setting the casing 30 in rotation past the aforementioned first angular position, and over a potentially significant travel, for example of several revolutions. As explained in detail here, this possibility of driving is used to facilitate the mounting, by clamping, of the cartridge 1 in the tap body 4, without increasing the axial space requirement of the adjustment mechanism. It will be noted that, in the case where the clamping of the cartridge is independent of its control member, this possibility of driving the control member makes it possible to prevent damage to the cartridge connected to the untimely passing of the aforementioned first angular position or related to the application by the user of an excessive stop torque to command the cartridge to fully cold.

Advantageously, to further protect the thermostatic element 50 from overstresses applied by the endpiece 62 under the effect of the compressed spring 63, the slide valve 40 is advantageously provided with a bearing surface 41 against which the endpiece 62 axially bears directly when the mechanism 60 is in the disengaged configuration, as shown in FIGS. 6 and 7: once the nut 62 is pressed axially upward against this bearing surface 41 of the slide valve 40, the stresses applied upward by the endpiece 62 are no longer transmitted to the thermostatic element 50, but are absorbed directly by the slide valve 40, which, if applicable, can bear axially against the casing 30, without risk of damage. In the example embodiment considered here, the bearing surface 41 is delimited at the free end of a spacer 42, permanently secured to the slide valve 40 while extending downward from a central region of this slide valve. Other embodiments of the bearing surface 41 can be considered.

Once the mechanism 60 is in the disengaged configuration, it is possible to continue to drive the casing 30 in rotation over as many revolutions as necessary to arrive at the complete screwing of the mounting ring 20 in the tap body 3. The mechanism 60 then stays in the disengaged configuration, with the threads 12A and 61B that remain disengaged from one another, while being kept axially butted against one another: upon each new revolution of the casing 30, the thread 61B of the nut 61 jumps with respect to the thread 12A of the cartridge body 10.

Once the mounting ring 20 is completely screwed in the tap body 3 and the cartridge body 10 is thus fixedly assembled in the cavity 4, the mechanism 60 must be returned from its disengaged configuration to its usage configuration. To do this, the casing 30 is driven in rotation about the axis X-X in the direction opposite that implemented during the clamping of the mounting ring 20, until it returns between the aforementioned first and second angular positions. In practice, the driving of the casing 30 is done at its upper part 33, emerging outside the cartridge body 10. This setting in rotation of the casing 30 leads to re-screwing the thread 61B of the nut 61 with the thread 12A of the cartridge body 10, the re-engagement of the threads being made easier by the action of the spring 63 tending to separate the nut 61 and the endpiece 62 from one another axially.

Advantageously, the threads 12A and 61B only begin to be screwed to one another in a single angular position of the casing 30. To this end, these threads 12A and 61B are indexed about the axis X-X, as clearly visible in FIGS. 8 and 9, in which the respective indexes of the threads 12A and 61B are referenced 12A.1 and 61B.1. In the case where each of the threads 12A and 61B includes several screw threads, such as three screw threads in the example considered here, these screw threads of each thread all starting on a same line either parallel to the axis X-X, or wound around the axis X-X, at the corresponding index 12A.1, 61B.1. In all cases, the indexing of the threads 12A and 61B makes it possible to index, around the axis X-X, the helical connection between the cartridge body 10 and the mechanism 60, therefore between the cartridge body 10 and the casing 30 due to the rotational connection between the nut 61 and the casing 30: by driving the casing 30 in rotation from beyond the aforementioned first angular position to this first angular position, the mechanism 60 returns to the usage configuration and, owing to the indexing of the threads 12A and 61B, the casing 30 can next be driven into a predetermined angular position, identified relative to the tap body 3 by the calibration marking mentioned above, advantageously borne by the upper part 33 of the casing 30.

Figure 10:
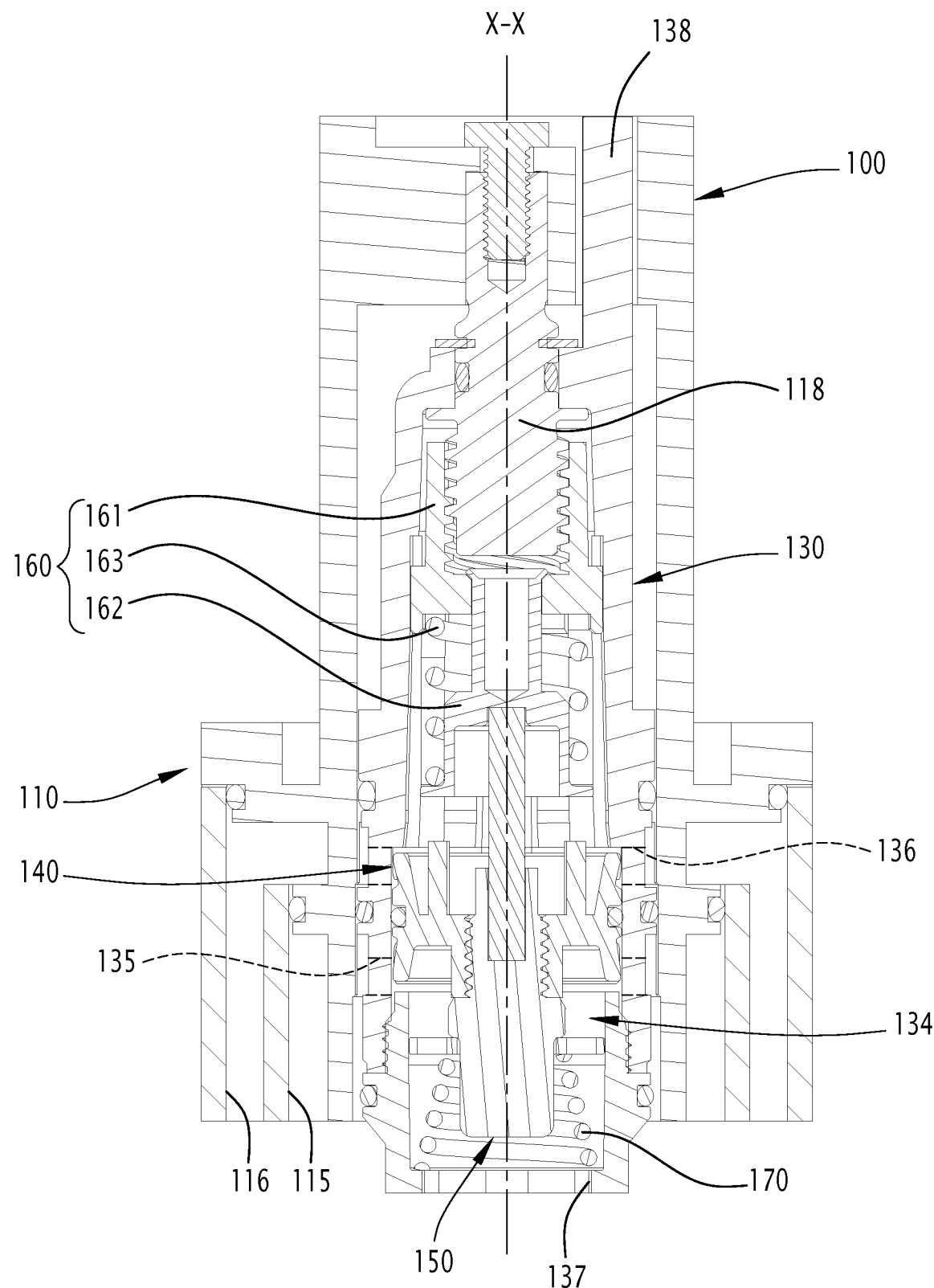
FIG. 10 is a view similar to FIG. 4, illustrating another embodiment of a thermostatic cartridge according to the invention.

FIG. 10 shows a thermostatic cartridge 100 as an alternative embodiment to the thermostatic cartridge 1 described thus far.

The cartridge 100 includes a cartridge body 110, a casing 130, a slide valve 140, a thermostatic element 150, a mechanism 160 and a return spring 170, which are functionally similar, respectively, to the cartridge body 10, the casing 30, the slide valve 40, the thermostatic element 50, the mechanism 60 and the return spring 70 of the cartridge 1.

In particular, the casing 130 delimits a chamber 134, a hot water inlet passage 135, a cold water inlet passage 136 and mixed water outlet passage 137, which are functionally, or even structurally, respectively similar to the chamber 34, the hot water inlet passage 35, the cold water inlet passage 36 and the mixed water outlet passage 37. One aspect differentiating the cartridge 100 with respect to the cartridge 1 relates to the fact that the mixed water outlet passage 137 faces downward, in other words toward the same axial side of the cartridge 1 on which the hot water and the cold water are allowed into the respective channels 115 and 116 of the body 110, which are functionally similar to the channels 15 and 16 of the cartridge body 10.

The mechanism 160 includes a nut 161, an endpiece 162 and a spring 163, which are functionally similar to the nut 61, the endpiece 62 and the spring 63 of the mechanism 60. The endpiece 162 and the spring 163 are even structurally similar to the endpiece 62 and the spring 63, while the nut 161 has, with respect to the nut 61, the specificity of not being received and screwed to the inside of a tubular wall of the cartridge body 110, but being screwed around a threaded rod 118 that belongs to the cartridge body 110 and that is fixedly secured to the rest of this cartridge body 110.

The alternative embodiment, shown in FIG. 10, illustrates the multiplicity of embodiments that may be assumed by the thermostatic cartridge according to the invention, once the latter includes, as control member of its adjustment mechanism of the thermostatic regulation temperature, a casing mounted on the cartridge body so as to rotate about the axis X-X, like the casings 30 and 130. The actuation of the movement of the adjustment mechanism by rotating this casing is done from outside the cartridge body, causing the casing to be driven in rotation from outside the cartridge body, like with the upper part 33 of the casing 30. For the casing 130, the example considered in FIG. 10 provides that this casing 130 includes an upper arm 138 that extends upward from the rest of the casing 130, until emerging toward the top of the body 110. Other arrangements of the casing 130 in order to drive it toward the outside of the cartridge body 110 may be considered.

What is claimed is:

1. A thermostatic cartridge, including:
  a casing, which is at least partially arranged inside a cartridge body, while being locked in translation along an axis relative to the cartridge body in an assembled state of the thermostatic cartridge in a tap body, which casing simultaneously delimits:
    a chamber in which a hot fluid and a cold fluid mix to form a mixed fluid,
    a hot fluid inlet passage, through which the hot fluid penetrates the chamber from outside the casing,
    a cold fluid inlet passage, through which the cold fluid penetrates the chamber from outside the casing, and
    a mixed fluid outlet passage, through which the mixed fluid contained in the chamber leaves the casing,
  a slide valve for regulating the temperature of the mixed fluid, which is arranged inside the chamber and which is movable along the axis relative to the casing so as to close, in respective inverse proportions, the hot fluid inlet passage and the cold fluid inlet passage,
  a thermostatic element which includes:
    a heat-sensitive body, which is secured to the slide valve and which is arranged to be in contact with the mixed fluid, and
    a piston, the heat-sensitive body and the piston moving relative to one another along the axis as a function of the temperature of the mixed fluid, and
  an adjustment mechanism for adjusting a thermostatic regulation temperature, which, in a usage configuration, is movably mechanically connected to the cartridge body and is designed to secure the position of the piston along the axis relative to the casing and to alter this position of the piston by actuating the adjustment mechanism to move relative to the cartridge body,
  wherein the casing is mounted on the cartridge body so as to rotate about the axis, while being rotationally drivable from the outside of the cartridge body, and is mechanically connected to the adjustment mechanism in the usage configuration so as to actuate the adjustment mechanism to move relative to the cartridge body when the casing is driven in rotation between first and second angular positions, which respectively correspond to an extreme low value and an extreme high value of the thermostatic regulation temperature.

2. The thermostatic cartridge according to claim 1, wherein the casing and the adjustment mechanism are connected in rotation about the axis relative to one another and are translatable along the axis relative to one another, and wherein the adjustment mechanism in the usage configuration and the cartridge body are connected to one another by a helical connection centered on the axis.

3. The thermostatic cartridge according to claim 2, wherein the adjustment mechanism includes:
   a nut which is connected in rotation about the axis to the casing, while being translatable along the axis relative to the casing, and which is provided with a thread which, in the usage configuration of the adjustment mechanism, is screwed to a thread of the cartridge body while forming the helical connection,
   an endpiece, which is mounted on the nut so as to slide along the axis, and
   a resilient compression member, which is axially interposed between the nut and the endpiece, and which is designed, when the adjustment mechanism is in the usage configuration, both to keep the endpiece axially pressed against the piston so as to adjust the position of this piston along the axis relative to the casing and to compress axially so as to resiliently take up a deployment overtravel of the piston relative to the heat-sensitive body.

4. The thermostatic cartridge according to claim 1, wherein the adjustment mechanism is designed, when the casing is driven in rotation about the axis past the first angular position, to go between the usage configuration and a disengaged configuration in which the connection between the adjustment mechanism and the cartridge body is interrupted.

5. The thermostatic cartridge according to claim 4, wherein the adjustment mechanism includes:
   a nut which is connected in rotation about the axis to the casing, while being translatable along the axis relative to the casing, and which is provided with a thread which, in the usage configuration of the adjustment mechanism, is screwed to a thread of the cartridge body while forming the helical connection,
   an endpiece, which is mounted on the nut so as to slide along the axis, and
   a resilient compression member, which is axially interposed between the nut and the endpiece, and which is designed, when the adjustment mechanism is in the usage configuration, both to keep the endpiece axially pressed against the piston so as to adjust the position of this piston along the axis relative to the casing and to compress axially so as to resiliently take up a deployment overtravel of the piston relative to the heat-sensitive body,
   and wherein, in the disengaged configuration of the adjustment mechanism, the thread of the nut is disengaged from the thread of the cartridge body, and wherein, in the disengaged configuration of the adjustment mechanism, the resilient compression member is designed to keep the thread of the nut and the thread of the cartridge body axially butted.

6. The thermostatic cartridge according to claim 1, wherein the casing has a tubular shape, centered on the axis, and includes:
   a first annular end part, which mechanically cooperates with the adjustment mechanism in the usage configuration,
   a second annular end part, which is axially opposite the first annular end part, which delimits the mixed fluid outlet passage and which extends at least partially outside the cartridge body, and
   an intermediate annular part, which couples the first and second annular end parts, and which delimits the hot fluid inlet passage and the cold fluid inlet passage.

7. The thermostatic cartridge according to claim 6, wherein the adjustment mechanism includes:
   a nut which is connected in rotation about the axis to the casing, while being translatable along the axis relative to the casing, and which is provided with a thread which, in the usage configuration of the adjustment mechanism, is screwed to a thread of the cartridge body while forming the helical connection,
   an endpiece, which is mounted on the nut so as to slide along the axis, and
   a resilient compression member, which is axially interposed between the nut and the endpiece, and which is designed, when the adjustment mechanism is in the usage configuration, both to keep the endpiece axially pressed against the piston so as to adjust the position of this piston along the axis relative to the casing and to compress axially so as to resiliently take up a deployment overtravel of the piston relative to the heat-sensitive body,
   and wherein the first annular end part of the casing cooperates mechanically with the nut of the adjustment mechanism.

8. The thermostatic cartridge according to claim 6, wherein the cartridge body comprises a tubular wall, inside which the casing is received coaxially and which includes:
   a first end part, which inwardly receives the first annular end part of the casing, and which inwardly receives, by mechanically cooperating with, the adjustment mechanism in the usage configuration, and
   a second end part, which is axially opposite the first end part and which inwardly receives the intermediate annular part of the casing.

9. The thermostatic cartridge according to claim 8, wherein the adjustment mechanism includes:
   a nut which is connected in rotation about the axis to the casing, while being translatable along the axis relative to the casing, and which is provided with a thread which, in the usage configuration of the adjustment mechanism, is screwed to a thread of the cartridge body while forming the helical connection,
   an endpiece, which is mounted on the nut so as to slide along the axis, and
   a resilient compression member, which is axially interposed between the nut and the endpiece, and which is designed, when the adjustment mechanism is in the usage configuration, both to keep the endpiece axially pressed against the piston so as to adjust the position of this piston along the axis relative to the casing and to compress axially so as to resiliently take up a deployment overtravel of the piston relative to the heat-sensitive body,
   and wherein the first end part of the tubular wall of the cartridge body inwardly receives, by mechanically cooperating with, the nut of the adjustment mechanism.

10. The thermostatic cartridge according to claim 8, wherein the second annular end part of the casing forms, at its axial end opposite the rest of the casing, a crown gear which is centered on the axis, which extends to the outside of the second end part of the tubular wall of the cartridge body, and which is designed to be coupled with a system for driving in rotation about the axis.

11. The thermostatic cartridge according to claim 10, wherein the crown gear extends entirely outside the second end part of the tubular wall of the cartridge body.

12. The thermostatic cartridge according to claim 10, wherein the crown gear is designed to be coupled with the system for driving in rotation about the axis by shape matching.

13. The thermostatic cartridge according to claim 8, wherein a inner volume of the tubular wall of the cartridge body is closed by a transverse wall of the cartridge body, which extends transversely to the axis and which is located at an axial end, opposite the second end part, of the first end part of the tubular wall, and wherein an tubular wall delimits, in its thickness, a channel for the hot fluid and a channel for the cold fluid, which open axially through the transverse wall and which, axially opposite this transverse wall, open into the inner volume of the tubular wall.

14. A mixer tap, comprising a tap body, which is designed to be supplied with hot fluid and with cold fluid, and a thermostatic cartridge, which is according to claim 1 and which is assembled to the tap body, the cartridge body of the thermostatic cartridge being fixedly placed inside the tap body.

15. The mixer tap according to claim 14, wherein the mixer tap comprises a mounting ring which fixedly immobilizes the cartridge body inside the tap body, and wherein the casing abuts axially against an inner shoulder of the cartridge body in a first direction and abuts axially against the mounting ring in a second direction opposite the first direction.

* * * * *